Nov. 25, 1952　　　J. B. TREVOR, JR　　　2,619,619
ELECTRICAL TESTING APPARATUS
Filed Sept. 21, 1945
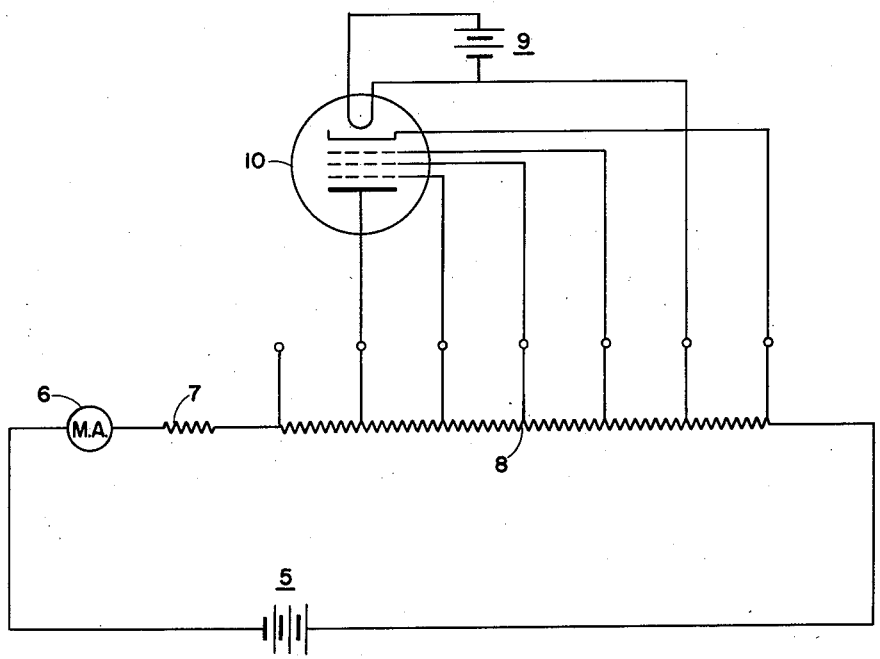
Inventor
JOHN B. TREVOR JR.

Patented Nov. 25, 1952

2,619,619

UNITED STATES PATENT OFFICE 2,619,619

ELECTRICAL TESTING APPARATUS

John B. Trevor, Jr., Washington, D. C.

Application September 21, 1945, Serial No. 617,897

2 Claims. (Cl. 315—369)

(Granted under the act of March 3, 1883, as amended April 30, 1928; 370 O. G. 757)

This invention relates to electrical testing apparatus and more particularly to a testing apparatus for indicating the presence of a short circuit between the elements of a multielement electron discharge device.

In employing electron discharge devices, such as vacuum or gas filled electronic tubes, it is usually necessary from time to time to test the characteristics and condition of the tubes and among other conditions to ascertain the presence of a short circuit between any of the elements of a given tube. It is, of course, essential that a tube be free of short circuits. While short circuit testing devices are well known, available short circuit testing devices in general test in a single operation only for the presence of a short circuit between any two elements. Thus, where a multielement tube is employed, substantially as many tests are required as there are separate elements in the tube.

An object of the present invention is to provide a simple and efficient testing device for ascertaining in a single operation the presence of one or more short circuits between any of the elements of a multielement electron discharge device.

In accordance with one embodiment of this invention, a short circuit testing device may be provided including means for applying required filament or heater voltage to the tube to be tested and a milliammeter connected in series with a multitap resistance and a source of direct current potential. Each of the several elements of the tube is connected to one of the taps of the resistance. With no short circuits present, the meter will indicate one current value; the presence of a short circuit between any two of the elements of the tube, however, provides a path around the associated portion of the resistance, causing thereby an increase in the current flowing in the milliammeter and thus indicating the presence of a short circuit.

Other objects and advantages of the present invention will be apparent from the following detailed description taken in conjunction with the drawings wherein the single figure is a schematic diagram showing a pentode type vacuum tube connected to a short circuit testing device constructed in accordance with this invention.

Referring now to the drawing, it will be seen that a source 5 of direct current potential, such as a battery, is shown connected in series with a current measuring device 6, such as a milliammeter, a current limiting resistance 7, and a multitap resistance 8. The source 5 is selected to provide a direct current potential of the same order of magnitude as the normal plate voltage of the tubes to be tested. It will be understood that in the type of test to be performed ordinarily this voltage will not be critical. A source 9 of filament or heater voltage is provided, as is well known in the art, as by the battery shown. The limiting resistance 7 is so chosen that if the resistance 8 is entirely shorted out, the milliammeter 6 will indicate close to full scale deflection but will not be damaged by the application of the maximum current. The resistance 8, as aforesaid, is provided with a plurality of taps brought out at substantially equally spaced intervals and the number of taps is equal to the largest number of independent elements in any tube to be tested.

In order to illustrate the operation of this device, a pentode type tube 10 has been shown. It will be understood, however, that this showing is merely for purpose of illustration and that any type of tube may be tested by the present device. Each of the several elements of the tube 10 is connected to a different tap of the resistance 8; thus a short circuit between any two elements, providing thereby a path around that portion of the resistance 8, will cause a change in the deflection of the milliammeter 6, that is to say will cause an increase in current flowing through the milliammeter. The sensitivity of the test may, of course, be predetermined by a proper selection of the value of the resistance 8, a higher value providing increased sensitivity. Ordinarily a relatively high value, compatible with the inherent interelectrode resistances of the tube to be tested, will be employed, thus providing maximum feasible sensitivity. While an indication may be expected if the tube elements are connected in a random manner to the taps of the resistance 8, it is of advantage to apply the required operating potential to the heater or filament from the source 9 and then to connect the electron emitting element, usually the cathode, to the tap of the resistance 8 with the highest positive potential. In a heater type tube, as shown in the drawing, the heater is then connected to the next adjacent tap so that a short between the heater and cathode may be detected. The other elements of the tube are connected to taps which approximate, insofar as feasible, the magnitude of their potential with respect to the cathode under service conditions. Such a method of connection prevents the flow of space current and the application of excessive voltage between the heater and the cathode. In this way normal operation is simulated and yet the reading of the milliammeter is not affected by space current.

It will be apparent from the foregoing that in accordance with this invention a testing device has been provided whereby in a single operation the presence of a short circuit between any of the elements of a multielement electron discharge tube may readily be determined. In some cases it may be desirable to provide a means for indicating between which two elements of the tube the short circuits exist. This may be accomplished by suitably connecting neon tubes between the several taps of the resistance 8 so that normally the neon tubes are lighted but upon the occurrence of a short circuit between any two elements, the associated neon tube will be extinguished.

While but one embodiment of this invention has been shown and described, it will be understood that many changes and modifications may be made therein without departing from the spirit or scope of the present invention.

The invention shown and described herein may be manufactured or used by or for the Government of the United States of America for governmental purposes without the payment of any royalties thereon or therefor.

What is claimed is:

1. In a device for testing a multielement electron discharge device including a cathode, a plate and at least one intermediately disposed electrode, a source of direct current potential, a current indicating device connected in series with said source, a multitap resistance connected in series between said indicating device and said source, and means for applying the required operating potential to said tube to render the cathode electron emissive, said cathode being connected to the tap of said resistance with the highest positive potential and the remaining elements of the discharge device being connected to taps on said resistance.

2. In a device for testing a multielement electron discharge device including a cathode, a plate and at least one intermediately disposed electrode, a source of direct current potential, a current indicating device connected in series with said source, a multitap resistance connected in series between said indicating device and said source, and means for applying the required operating potential to said tube to render the cathode electron emissive, said cathode being connected to the tap of said resistance with the highest positive potential and the remaining elements of the discharge device being connected to taps on said resistance which provide a potential with respect to the cathode approximating that encountered under service conditions.

JOHN B. TREVOR, Jr.

REFERENCES CITED

The following references are of record in the file of this patent:

UNITED STATES PATENTS

| Number | Name | Date |
|---|---|---|
| 1,718,557 | Hickok | June 25, 1929 |
| 1,748,847 | Miller | Feb. 25, 1930 |
| 1,927,560 | White | Sept. 19, 1933 |
| 1,939,059 | Kimmell | Dec. 12, 1933 |
| 2,053,101 | Olesen | Sept. 1, 1936 |